US012360071B2

(12) United States Patent
Loufakis et al.

(10) Patent No.: US 12,360,071 B2
(45) Date of Patent: Jul. 15, 2025

(54) METHOD AND SYSTEM FOR SIMULTANEOUS MECHANICAL AND ELECTROCHEMICAL TESTING OF ELECTRODES (71) Applicant: The Texas A&M University System, College Station, TX (US)

(72) Inventors: Dimitrios Loufakis, College Station, TX (US); James G. Boyd, Brenham, TX (US); Jodie Lutkenhaus, College Station, TX (US); Dimitris C. Lagoudas, College Station, TX (US)

(73) Assignee: The Texas A&M University System, College Station, TX (US)

( * ) Notice: Subject to any disclaimer, the term of this patent is extended or adjusted under 35 U.S.C. 154(b) by 674 days.

(21) Appl. No.: 17/585,276

(22) Filed: Jan. 26, 2022

(65) Prior Publication Data
US 2024/0393284 A1 Nov. 28, 2024

Related U.S. Application Data (60) Provisional application No. 63/143,404, filed on Jan. 29, 2021.

(51) Int. Cl.
*G01N 27/27* (2006.01)
*G01N 3/08* (2006.01)
*G01N 27/49* (2006.01)
*H01M 10/42* (2006.01)

(52) U.S. Cl.
CPC ............... *G01N 27/27* (2013.01); *G01N 3/08* (2013.01); *G01N 27/49* (2013.01); *H01M 10/4285* (2013.01)

(58) Field of Classification Search
CPC .......... G01N 27/27; G01N 3/08; G01N 27/49; G01N 27/26; G01N 17/006; G01N 27/42; G01N 17/02; G01N 3/42; G01N 1/28; G01N 27/041; G01N 3/00; G01N 13/04; G01N 19/04; G01N 33/24; G01N 27/28; G01N 33/4833; H01M 10/4285; H01M 8/0297; H01M 8/188; H01M 8/0273; H01G 11/02; H01G 11/26; B60L 50/64
See application file for complete search history.

(56) References Cited

U.S. PATENT DOCUMENTS

2019/0204194 A1* 7/2019 Zhao ..................... G01N 3/42

* cited by examiner

*Primary Examiner* — Brandi N Hopkins
(74) *Attorney, Agent, or Firm* — Winstead PC (57) ABSTRACT A mechanical and electrochemical testing apparatus includes a tensile frame having a first grip and a second grip. An electrochemical cell is disposed between the first grip and the second grip. The electrochemical cell includes a working electrode port and a counter electrode port. An electrolyte is disposed in the electrochemical cell. A working electrode is coupled to the first grip and the second grip. The working electrode is in contact with the electrolyte in the working electrode port. A counter electrode is disposed in the counter electrode port. A potentiostat is coupled to the working electrode and the counter electrode.

20 Claims, 11 Drawing Sheets

METHOD AND SYSTEM FOR SIMULTANEOUS MECHANICAL AND ELECTROCHEMICAL TESTING OF ELECTRODES

CROSS-REFERENCE TO RELATED APPLICATIONS

This patent application claims priority from, and incorporates by reference the entire disclosure of, U.S. Provisional Application No. 63/143,404 filed on Jan. 29, 2021.

STATEMENT REGARDING FEDERALLY-FUNDED RESEARCH

This invention was made with government support under grant number AFOSR—FA9550-19-10170 awarded by the Air Force Office of Scientific Research. The government has certain rights in the invention.

TECHNICAL FIELD

The present disclosure relates generally to testing of electrodes and electroactive materials, more particularly, but not by way of limitation, to a system for facilitating simultaneous testing of mechanical properties and electrical or electrochemical properties.

BACKGROUND

This section provides background information to facilitate a better understanding of the various aspects of the disclosure. It should be understood that the statements in this section of this document are to be read in this light, and not as admissions of prior art.

Several industries, as well as private or public testing facilities around the world have turned their attention to battery-reliability testing. Most notably, the automotive industry has made large investments in launching electric vehicle models to the market; the cycling life and reliability of the battery packs is key to placement of electric vehicles in the market. Companies such as Tesla, Chevrolet, Nissan, Toyota, Volkswagen, BMW, and others have innovated in the electric vehicle market. This innovation has created motivation for global testing facilities and research into reliability and resilience of energy storage systems, and understanding of the physical mechanisms that prevent long cycling life.

To date, attempts have been made to simultaneously test the mechanical and electrochemical properties of electrochemical and energy storage systems, but these attempts have not been conducted at the electrode level. To understand the coupling electrochemical and mechanical phenomena, attempts have been made to stretch, compress, or bend complete energy storage devices in conventional cell geometries, or pouch cells. Furthermore, electrode materials have been stretched inside a vessel filled with electrolyte, along with a counter and a reference electrode. However, arbitrarily stretching electrodes inside a pool of electrolyte does not allow for control of the mechanical aspect of the experiment, and mechanical properties are not measured.

Mechanical stresses on battery and supercapacitor electrodes are considered the largest causes of capacity fade and general electrochemical degradation. Even the process of mere electrochemical cycling of Li-ion battery (LIB) electrodes has been shown to cause plastic deformation, cavitation, crack formation, and gradient stresses. In addition, applications such as structural energy storage, or even flexible and bendable electronics require external forces to be acted upon the electrodes by definition, as they aim to combine the structural and energy storage functions of a system into a single multifunctional unit to realize volume and mass savings. Therefore, stresses will be applied to structural electrodes under normal use. Mechanical properties (e.g. modulus of elasticity, strength, and toughness) are important structurally, while electrochemical properties (e.g. capacitance and cycling stability) are essential for the energy storage aspect. The exploration of the dependence between mechanical deformation and electrochemical response of electrode materials is vital for conventional electrode materials, as well as electrodes for specialized applications.

SUMMARY

Aspects of the disclosure relate to a mechanical and electrochemical testing apparatus. The mechanical and electrochemical testing apparatus includes a tensile frame having a first grip and a second grip. An electrochemical cell is disposed between the first grip and the second grip. The electrochemical cell includes a working electrode port and a counter electrode port. An electrolyte is disposed in the electrochemical cell. A working electrode is coupled to the first grip and the second grip. The working electrode is in contact with the electrolyte over the working electrode port. A counter electrode is disposed in the counter electrode port. A potentiostat is coupled to the working electrode and the counter electrode.

Aspects of the disclosure relate to a method of mechanical and electrochemical testing. The method includes securing a working electrode between a first grip and a second grip of a tensile frame and contacting the working electrode with an electrolyte disposed in an electrochemical cell. The working electrode is electrically coupled to a potentiostat. A counter electrode is electrically coupled to the potentiostat. The counter electrode is placed in the electrochemical cell such that the counter electrode is in contact with the electrolyte. A potential difference is applied to the working electrode and the counter electrode via the potentiostat. A stress is applied to the working electrode via the tensile frame. A strain experienced by the working electrode is measured.

Aspects of the disclosure relate to a method of sample preparation for mechanical and electrochemical testing. The method includes connecting, utilizing silver paste, a first wire to a first end of a working electrode and connecting, utilizing silver paste, a second wire to a second end of the working electrode. Epoxy tabs are used to electrically insulate the first end and the second end of the working electrode and improve grip. Utilizing silver paste, a third wire is connected to a counter electrode. An epoxy backing is applied on the counter electrode to prevent degradation of the silver paste.

This summary is provided to introduce a selection of concepts that are further described below in the Detailed Description. This summary is not intended to identify key or essential features of the claimed subject matter, nor is it to be used as an aid in limiting the scope of the claimed subject matter.

BRIEF DESCRIPTION OF THE DRAWINGS

A more complete understanding of the subject matter of the present disclosure may be obtained by reference to the following Detailed Description when taken in conjunction with the accompanying Drawings wherein.

DETAILED DESCRIPTION

It is to be understood that the following disclosure provides many different embodiments, or examples, for implementing different features of various embodiments. Specific examples of components and arrangements are described below to simplify the disclosure. These are, of course, merely examples and are not intended to be limiting. The section headings used herein are for organizational purposes and are not to be construed as limiting the subject matter described.

A mechanical and electrochemical test apparatus 100 allows for experimental examination of the coupled electrochemical and mechanical response of electrochemically active materials such as, for example, inorganic or organic electrodes and electroactive polymers. Such materials are used in applications such as, for example, battery, capacitor, or supercapacitor electrodes, electrochemical sensors, and biological tissues. The mechanical and electrochemical test apparatus 100 has the capability to test samples of specific geometries; namely films, fibers, and dogbone specimens.

Figure 1:
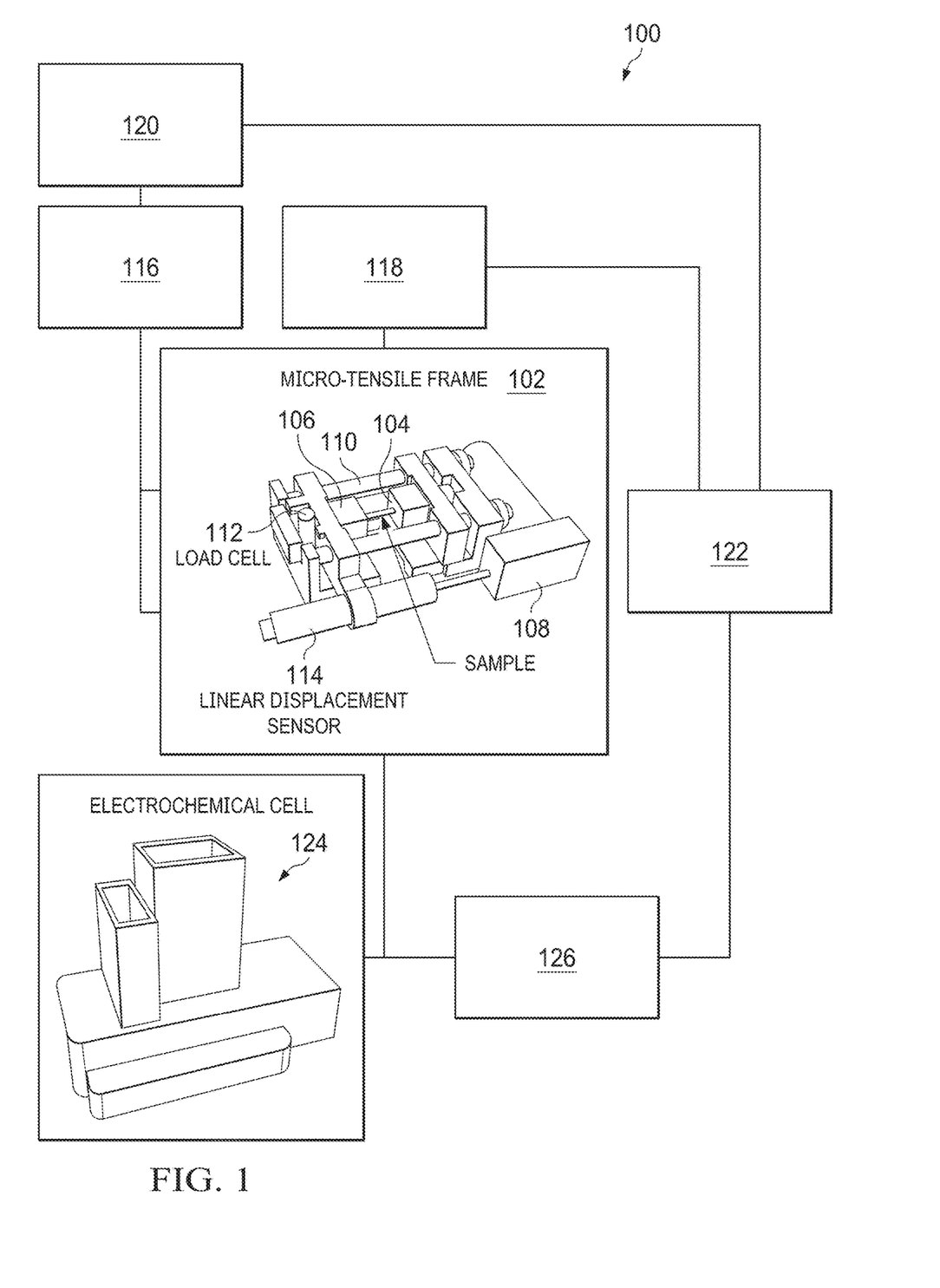
FIG. 1 is a schematic diagram of a mechanical and electrochemical test apparatus according to aspects of the disclosure.

FIG. 1 is a schematic diagram of a mechanical and electrochemical test apparatus 100. The apparatus 100 includes a tensile frame 102 that is capable of imparting a tensile stress or tensile strain to a test article such as, for example, a working electrode. The tensile frame 102 may be a screw-driven frame and includes a first grip 104 and a second grip 106, which is arranged in opposition to the first grip 104. The first grip 104 and the second grip 106 are linearly actuated towards each other and away from each other via a motor assembly 108. In various embodiments, the first grip 104 and the second grip 106 are actuated by threaded members 110 such as, for example, screws; however, in other embodiments, the first grip 104 and the second grip 106 may be actuated by other mechanisms such as, for example, electromechanical systems, pneumatic, or hydraulic pistons.

A load cell 112 is disposed on at least one of the first grip 104 and the second grip 106. In various embodiments, the load cell 112 is capable of sensing a mechanical load applied to the test article by the first grip 104 and the second grip 106 and converting the load into a first electrical signal. The mechanical load can be tensile or compressive. In various embodiments, the load cell 112 is rated for up to 5 lbf. The tensile frame 102 also includes a linear encoder 114 that is coupled to the first grip 104 and the second grip 106. The linear encoder 114 measures a linear displacement of the second grip 106 relative to the first grip 104 and converts the measured linear displacement to a second electrical signal. In various embodiments, the linear encoder 114 measures up to 7 mm of displacement.

Still referring to FIG. 1, the apparatus includes a signal conditioner 116 for the first electrical signal, a signal conditioner 116 for the second electrical signal, and a motor controller 118. The signal conditioners 116 are electrically coupled to a data acquisition unit 120, the load cell 112, and the linear encoder 114, and receive the first electrical signal and the second electrical signal from the load cell 112 and the linear encoder 114, respectively. Both load cell 112 and linear encoder 114 feature full-bridge strain gage circuits and output a weak signal of a few mV, which is very susceptible to electromagnetic noise. To reduce noise, short and shielded cables can be used to carry the signal, and strain gage conditioning circuits can be used between the sensors and the data acquisition system. The strain gage conditioning circuits include a low-pass filter which eliminates high-frequency noise that gets picked up from nearby equipment, and an amplifier circuit that amplifies the clean signal to useable values. In various embodiments, the signal conditioner 116 amplifies and removes electromagnetic noise from the first signal from the load cell 112 and the second signal from the linear encoder 114. The first signal and the second signal are transmitted to the data acquisition unit 120 and are converted from analog to digital format. The data acquisition unit 120 then transmits the converted first signal and the converted second signal to a processor 122. The signal processor 122 applies calibration functions. The motor controller 118 is electrically coupled to the processor 122. The motor controller 118 is electrically coupled to the motor assembly 108 and provides a driving signal to the motor assembly 108 via pulse width modulation (PWM). With PWM, the power signal from the controller to the motor is turned on and off at high rates, resulting in the division of the signal to discrete pulses. The ratio of "on" to "off" states determines the average supplied power per time unit. The controller unit accepts serial commands over a VISA interface to control the speed of the motor both in terms of magnitude and polarity. The motor's lowest possible speed is 5 revolutions per minute (RPM), which results in a displacement rate of appx 0.553 mm/min. That displacement rate would result in strain rate of approximately 2.8%/min, which is too high compared to our previous studies and might introduce large errors to our results. Therefore, a gearbox with a reduction ratio of 592:1 was installed as part of the motor assembly 108.

Still referring to FIG. 1, the apparatus 100 includes an electrochemical cell 124 that is positioned between the first grip 104 and the second grip 106. A potentiostat 126 is electrically coupled to the processor 122. In various embodiments, the potentiostat 126 applies a potential difference or electrical current to the test article. In various embodiments the applied potential difference or electrical current may be for example, constant, sinusoidal, a linear cyclical pattern such as, for example, a reciprocating pattern of linear increases and decreases, or any other predetermined pattern.

Figure 2:
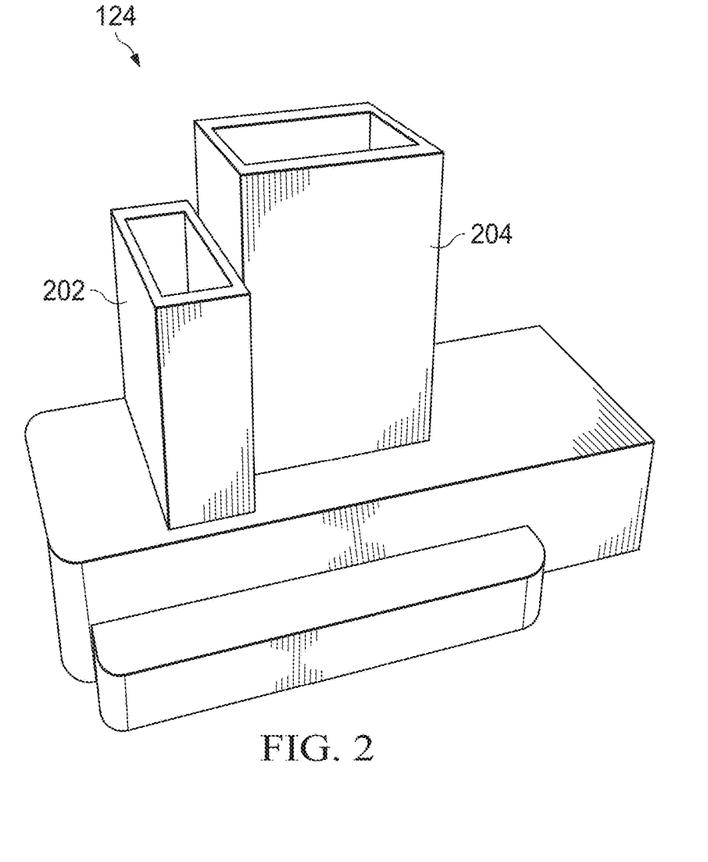
FIG. 2 is a perspective view of an electrochemical cell according to aspects of the disclosure.

FIG. 2 is a perspective view of an electrochemical cell 124. The electrochemical cell 124 includes a working electrode port 202 and a counter electrode port 204. The entirety of the electrochemical cell 204 is hollow and an internal opening connects the working electrode port 202 with the counter electrode port 204. In various embodiments, the working electrode port measures, for example, approximately 4 mm length by approximately 15 mm width by approximately 17.5 mm height. The wall surrounding the working electrode port 202 is, in various embodiments, approximately 0.75 mm thick. The counter electrode port 204, in various embodiments, measures, for example, approximately 11 mm length by approximately 8 mm width by approximately 23.5 mm height. In various embodiments, the wall surrounding the counter electrode port 204 is, for example, approximately 1.5 mm thick. All of the foregoing dimensions are exemplary only and embodiments of the electrochemical cell 124 may include any dimensions as required for a particular application. In various embodiments, the working electrode port 202 is arranged to have a height slightly below a level of the first grip 104 and the second grip 106. In various embodiments, the counter electrode port 204 is arranged to have a height greater than the working electrode port 202. In various embodiments, the working electrode port 202 and the counter electrode port 204 are constructed of a solid material and are capable of containing a liquid electrolyte without corrosion or other degradation of integrity. In various embodiments, the working electrode port 202 and the counter electrode port 204 are constructed of, for example, a 3-D printed polymeric material coated with a polymeric film, or a polymeric material processed by submersion in a chemical, for example, acetone, that results in partial melting and re-solidification; however, in other embodiments, other materials and other processing methods may be utilized provided that such materials do not degrade when in the presence of electrolyte and are not otherwise electrochemically reactive with the electrolyte.

Figure 3:
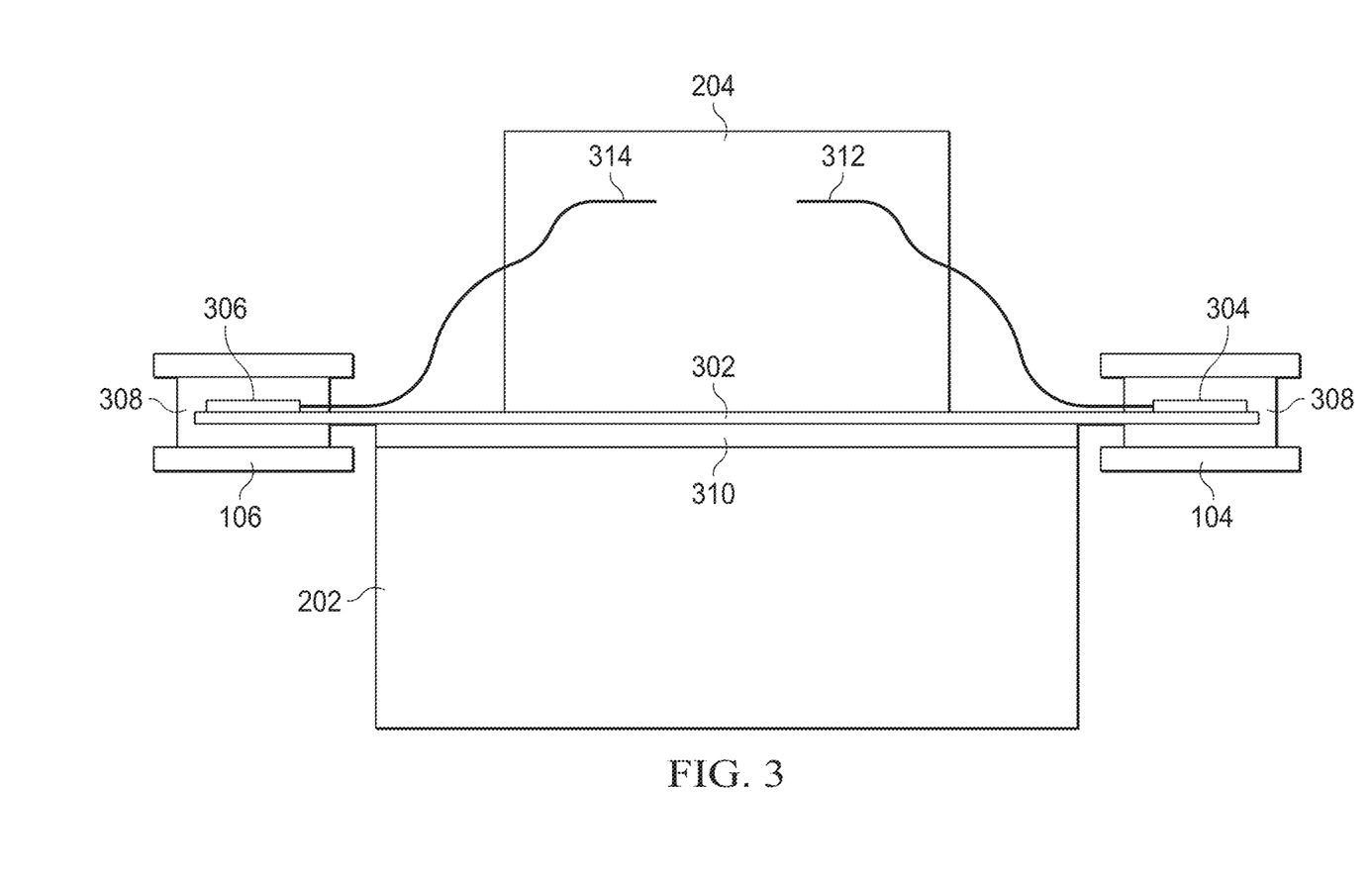
FIG. 3 is a side view of a working electrode port according to aspects of the disclosure.

FIG. 3 is a side view of a working electrode 302 secured in the apparatus 100. In various embodiments, the working electrode 302 is constructed of a metallic, polymeric, or composite material. A first end 304 of the working electrode 302 is secured in the first grip 104 and a second end 306 of the working electrode is secured in the second grip 106. An epoxy tab 308 is disposed between the first end 304 and the first grip 104 and between the second end 306 and the second grip 106. In various embodiments, the epoxy tab 308 electrically insulates the working electrode 302 from the first grip 104 and the second grip 106. Additionally, the epoxy tab 308 provides additional friction between the first grip 104 and the first end 304 and between the second grip 106 and the second end 306. When the first end 304 and the second end 306 are secured in the first grip 104 and the second grip 106, respectively, the working electrode 302 is positioned just above the working electrode port 202 of the electrochemical cell 124. During operation, the working electrode port 202 is overfilled with electrolyte 310 such that a fluid meniscus is formed above the working electrode port 202. The working electrode 302 contacts the meniscus of the electrolyte 310; however, the working electrode 302 does not contact the working electrode port 202. Thus, the working electrode port 202 does not impart friction on the working electrode 302. A first wire 312 is secured on the first end 304 such that the first wire 312 is in electrical contact with the first end 304 of the working electrode 302. Similarly, a second wire 314 is secured on the second end 306 such that the second wire 314 is in electrical contact with the second end 306 of the working electrode 302. In various embodiments, the first wire 312 and the second wire 314 are silver-coated copper wires due to their associated high electrical conductivity, low electrical resistance, and low electrochemical reactivity. In various embodiments, silver paste is utilized to connect the first wire 312 to the first end 304 and to connect the second wire 314 to the second end 306.

Figure 4:
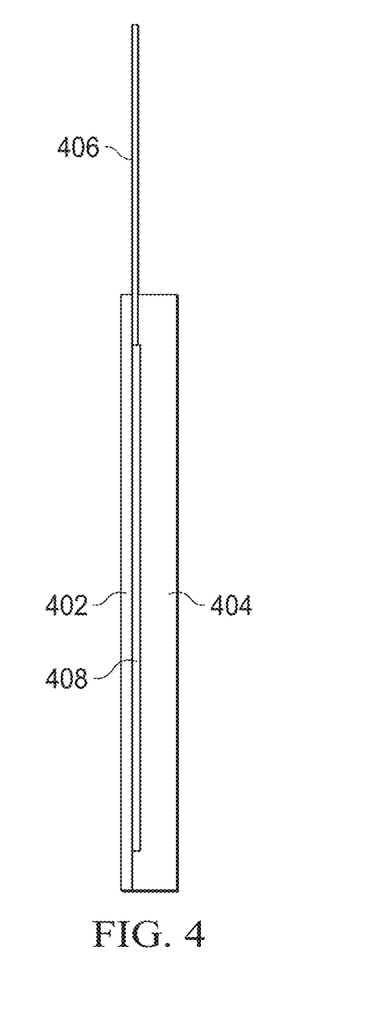
FIG. 4 is a side view of a counter electrode according to aspects of the disclosure.

FIG. 4 is a side view of a counter electrode 402. In various embodiments, the counter electrode 402 is constructed of a metallic material or other organic or inorganic electrode material such as, for example carbon-based composites. A third wire 406 is electrically coupled to the counter electrode 402. In various embodiments, the third wire 406 is a silver-coated copper wire. In various embodiments, silver paste 408 is utilized to connect the third wire 406 to the counter electrode 402. An epoxy backing 404 is applied to the counter electrode 402. The epoxy backing prevents degradation of the silver paste 408 due to the presence of the electrolyte and protects the counter electrode 402/silver paste interface during testing.

Figure 5:
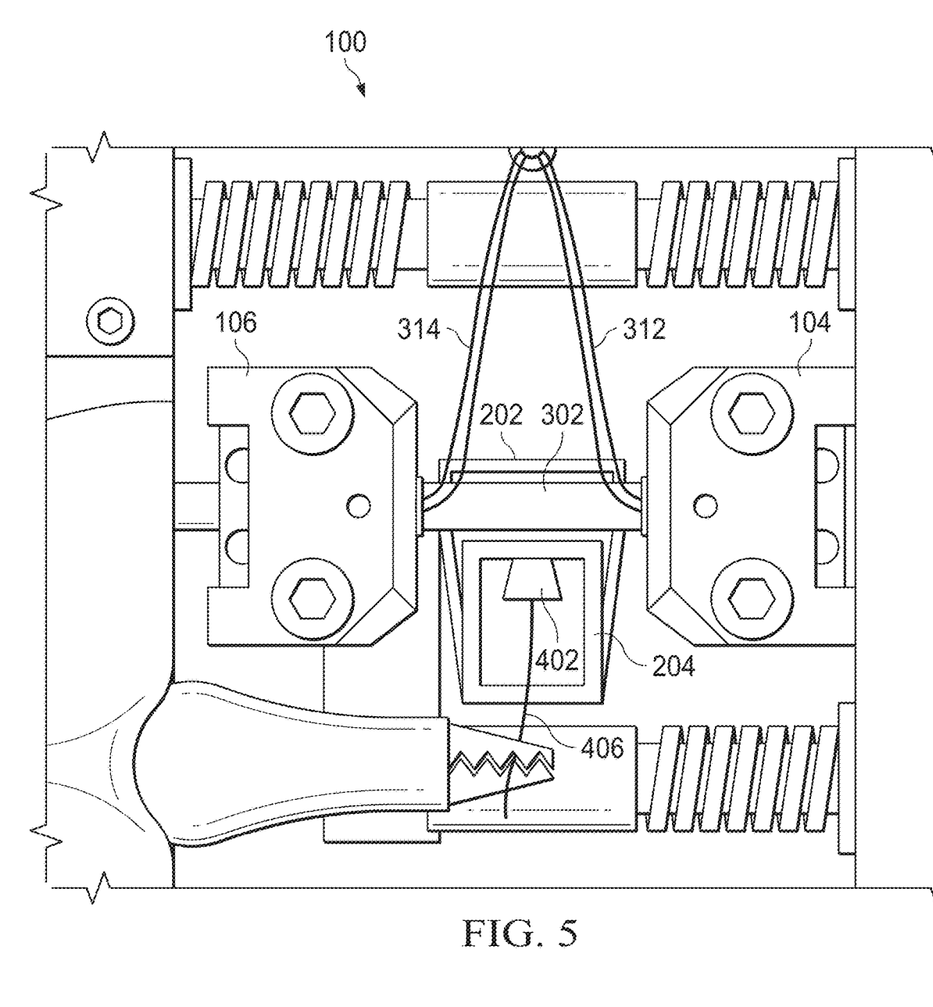
FIG. 5 is a top view of the test apparatus according to aspects of the disclosure.

FIG. 5 is a top view of the apparatus 100. During operation, the first end 304 of the working electrode 302 is secured in the first grip 104. The second end 306 of the working electrode 302 is secured in the second grip 106. The working electrode 302 contacts the electrolyte in the meniscus above the working electrode port 202; however, the working electrode 302 does not contact the working electrode port 202 itself. The first wire 312 and the second wire 314 are coupled to a first terminal of the potentiostat 126. The counter electrode 402 is placed in the counter electrode port 204 such that the counter electrode 402 is in contact with the electrolyte 310. The third wire 406 is coupled to a second terminal of the potentiostat 126. During operation, the potentiostat 126 applies a potential difference or electrical current between the working electrode 302 and the counter electrode 402. In various embodiments, the potential difference may be for example, constant, sinusoidal, a linear cyclical pattern such as, for example, a reciprocating pattern of linear increases and decreases, or any other predetermined pattern. The potential difference or electrical current supplied by the potentiostat 126 causes charging and discharging of the working electrode 302.

Still referring to FIG. 5, the first grip 104 and the second grip 106 apply a linear displacement to the first end 304 of the working electrode 302 and the second end 306 of the working electrode 302. In various embodiments, movement of the first grip 104 and the second grip 106 is dictated by the motor controller 118 suppling a signal to the motor assembly 108. The linear encoder 114 measures the displacement of the first grip 104 and the second grip 106 relative to each other in order to determine the displacement experienced by the working electrode 302. The load cell 112 measures a magnitude of stress applied to the working electrode 302. The load cell 112 transmits the first signal, corresponding to the mechanical load on the working electrode 302, to the signal conditioner 116 and the linear encoder 114 transmits the second signal, corresponding to the displacement of the working electrode 302, to the signal conditioner 116. The first signal and the second signal are transmitted to the data acquisition unit 120, converted from analog to digital, and consequently transmitted to the processor 122. The first signal and the second signal are translated to force and displacement, respectively by the processor 122 via calibration functions.

Figure 6:
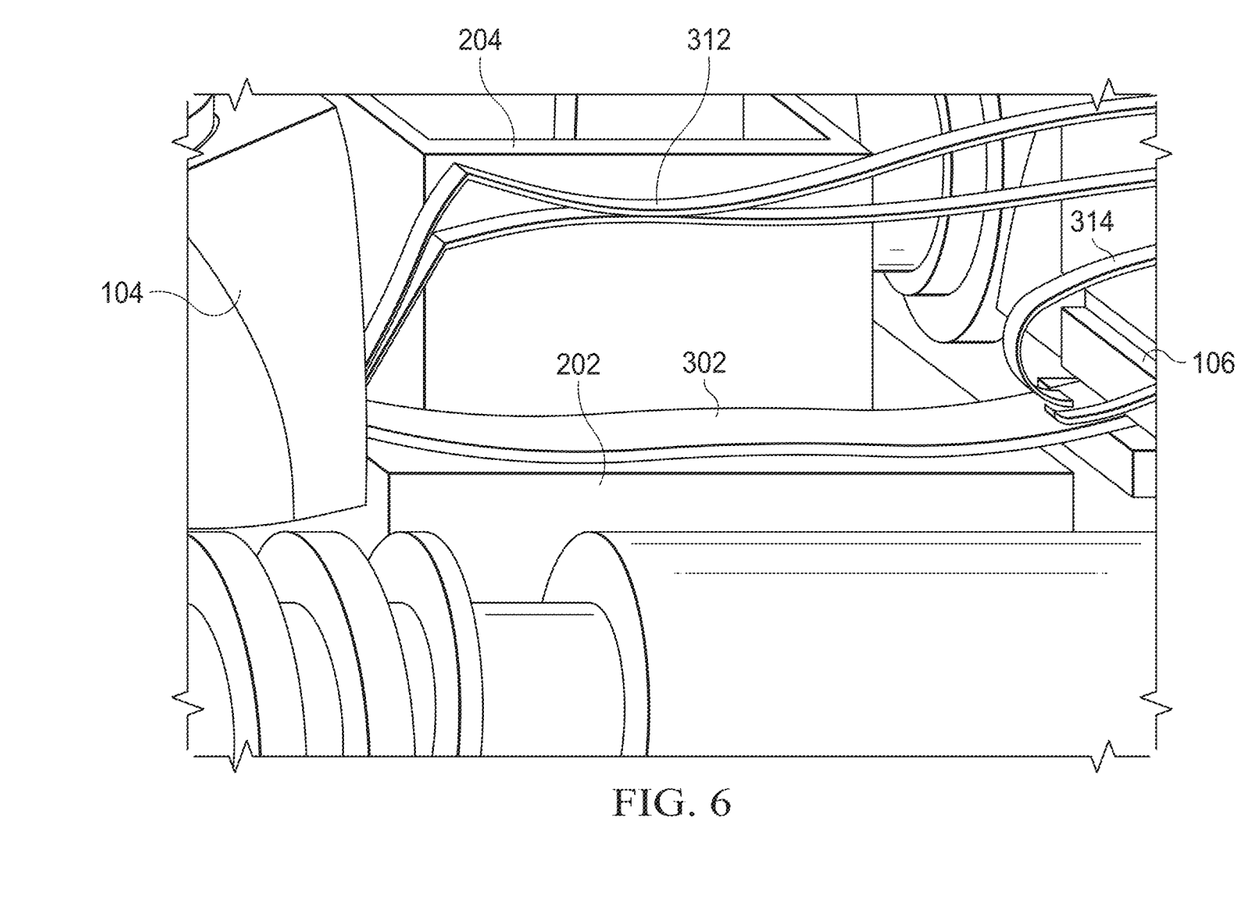
FIG. 6 is a side view of a working electrode and the electrochemical cell according to aspects of the disclosure.
Figure 7:
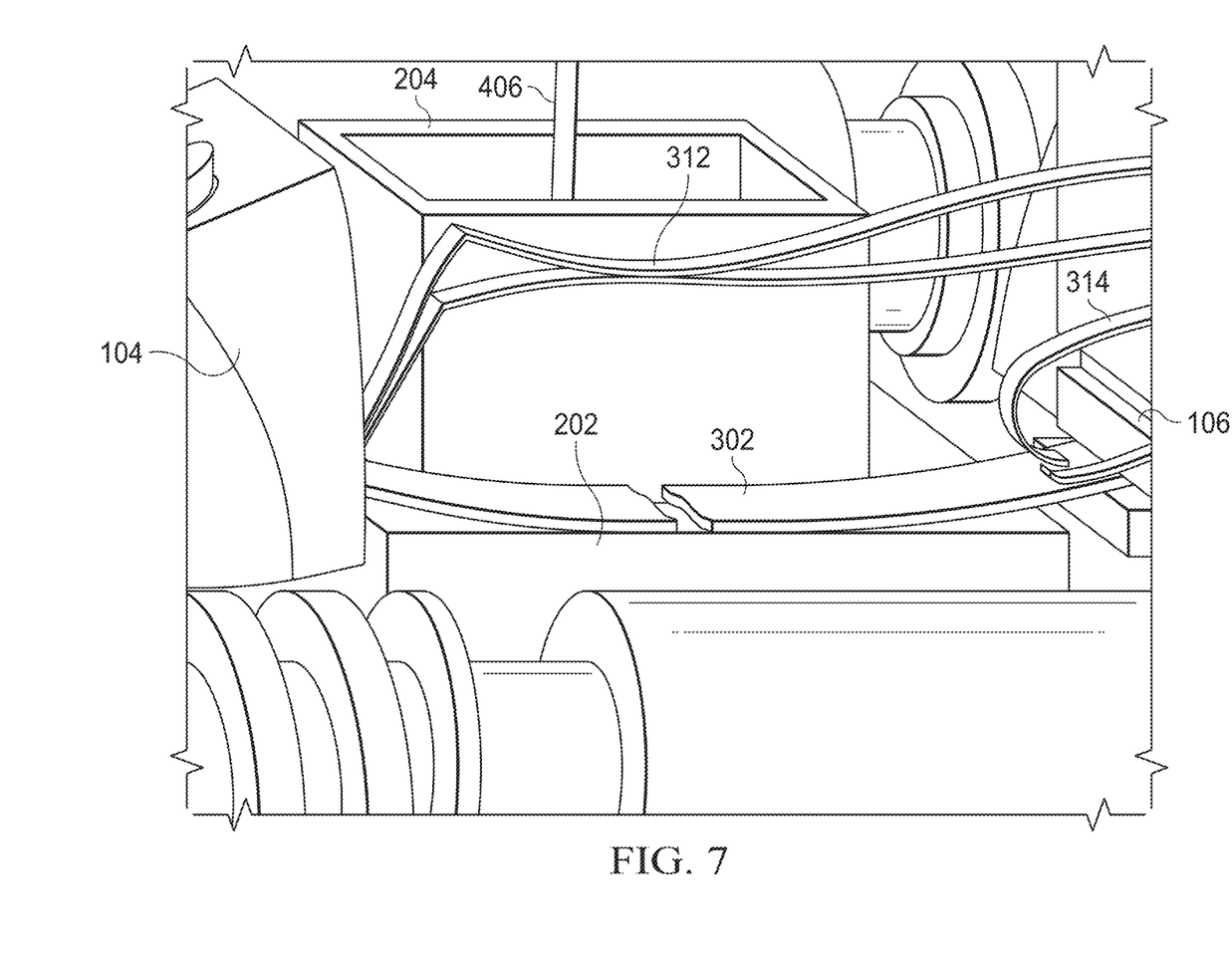
FIG. 7 is a side view of the working electrode after failure according to aspects of the disclosure.

FIG. 6 is a side view of a working electrode 302 over the electrochemical cell 124. FIG. 7 is a side view of the working electrode 302 after failure. Referring to FIGS. 6-7 collectively, prior to failure, the working electrode 302 is not in contact with the working electrode port 202. However, the working electrode 302 contacts a meniscus of the electrolyte 310 that forms above a level of the working electrode port 202. Such an arrangement can be seen in FIG. 7 where, after failure of the working electrode 302, the working electrode 302 is in contact with the working electrode port 202.

Figure 8:
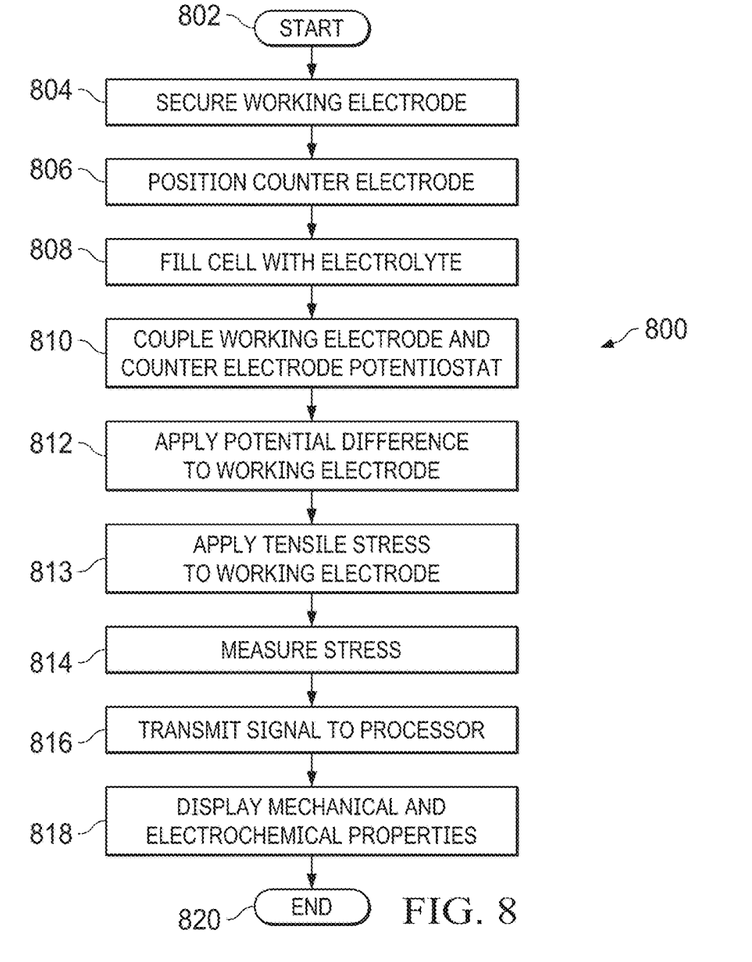
FIG. 8 is a flow diagram of a process for simultaneous testing of mechanical and electrochemical properties according to aspects of the disclosure.

FIG. 8 is a flow diagram of a process 800 for simultaneous testing of mechanical and electrochemical properties. The process 800 begins at step 802. At step 804, the working electrode 302 is secured in the first grip 104 and the second grip 106. At step 806, the counter electrode 402 is positioned in the counter electrode port 204. At step 808, the working electrode port 202 and the counter electrode port 204 are filled with the electrolyte 310. The working electrode 302 contacts a meniscus of the electrolyte 310 above the working electrode port 202; however, the working electrode 302 does not contact the working electrode port 202. At step 810, the first wire 312 and the second wire 314 are coupled to the first terminal of the potentiostat 126 and the third wire 406 is coupled to the second terminal of the potentiostat 126. At step 812, the potentiostat 126 applies a potential difference or electrical current between the working electrode 302 and the counter electrode 402. In various embodiments, the potential difference may be constant or applied in a cyclical pattern. At step 813, the first grip 104 and the second grip 106 apply a linear displacement to the first end 304 of the working electrode 302 and the second end 306 of the working electrode 302. At step 814, the load cell 112 measures the force applied to the working electrode 302 and transmits the first signal, corresponding to the stress on the working electrode 302, to the data acquisition unit 120 via the signal conditioner 116. The linear encoder 114 measures the displacement between the first grip 104 and the second grip 106 and transmits the second signal, corresponding to the strain of the working electrode 302, to the data acquisition unit 120 via the signal conditioner 116. At step 816, the data acquisition unit 120 converts the first signal and the second signal from analog to digital and transmits the first signal and the second signal to the processor 122. The processor 122 applies calibration functions to determine the force on the working electrode 302 and the displacement between the first end 304 of the working electrode 302 and the second end 306 of the working electrode 302 and record the impact of electrochemical cycling on the mechanical properties of the working electrode 302 and the impact of deformation to the electrochemical properties of the working electrode 302. At step 818, the processor 122 displays and stores the values of the mechanical and electrochemical parameters including, for example, applied force, displacement, potential and current as a function of time, which is the universal parameter of the test. The process ends at step 820.

Figure 9:
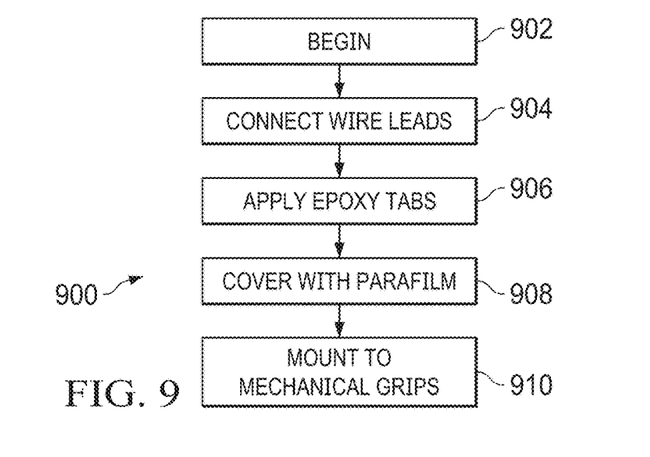
FIG. 9 is a diagram illustrating a process for preparation of a specimen for mechanical and electrochemical testing according to aspects of the disclosure.

FIG. 9 is a diagram illustrating a process 900 for preparation of a specimen for mechanical and electrochemical testing. Process 900 begins at step 902. At step 902, a working electrode 302 is selected for testing. At step 904, the first wire 312 is coupled, using silver paste, to the first end 304 of the working electrode 302 and the second wire 314 is coupled, using silver paste, to the second end 306 of the working electrode 302. At step 904, epoxy is applied to the first end 304 and the second end 306 in order to protect the first wire 312 and the second wire 314 from clamping. At step 906, the first end 304 and the second end 306 are covered with a coating such as for example, sealing film, in order to improve grip. At step 908, the first end 304 is secured in the first grip 104 and the second end 306 is secured in the second grip 106.

The test apparatus 100 includes two distinct subsystems; a mechanical subsystem and an electrochemical subsystem. The mechanical subsystem includes the tensile frame 102, which may be, for example, a micro-tensile frame. The load cell 112 may be, for example, a 5 lbf load cell. The linear encoder 114 may be capable of, for example, linear displacement with a full displacement range of 1 in. The motor assembly 108 may be, for example, a 12 V DC motor with, for example, a 592:1 ratio gearbox. The linear encoder 114 and the load cell 112 are strain gages, and thus, the signal conditioner 116 is employed for each of them. The signal conditioner 116 may be, for example, a strain gage conditioning and amplification circuit. Data from the load cell 112 and the linear encoder 114 are acquired by the data acquisition unit 120, which may be, for example, a National Instruments USB-6211 Multifunctional I/O device. In various embodiments, the motor assembly 108 is powered by the motor controller 118. After assembly, the mechanical subsystem is controlled by, for example, a custom virtual instrument such as, for example, a LabVIEW VI (virtual instrument). The electrochemical subsystem consists of the electrochemical cell 124, which may be, for example, 3D printed utilizing a thermoplastic polymer such as, for example, acrylonitrile butadiene styrene ("ABS"), coated with a protective coating, or chemical processing, such as, for example, submersion in acetone for 15 seconds. In various embodiments, the protective covering could be, for example, a rubber-based coating such as, for example, PLASTI DIP® rubber coating.

The mechanical and electrochemical test apparatus 100 is able to test the electrochemo-mechanical coupling at the electrode level. Therefore, an understanding of the electrode material under testing can be achieved. For example, quantitative measurements can be acquired for the change in stiffness as a function of the state of charge, or the change in the electrode's ability to store charge as a function of applied mechanical load. Thus, insights can be given to the mechanical or electrochemical degradation and reliability of an electrode material due to coupling phenomena. Additionally, the electrochemical cycling life and the mechanical damage or fatigue can be explored in new ways to answer questions that naturally arise due on the application conditions.

The mechanical and electrochemical test apparatus 100 allows for simultaneous electrochemical and mechanical testing of battery or supercapacitor electrodes. The electrochemical cell 124 features a port for the sample being tested (working electrode 302) and a port for the counter electrode 402. Specifically, the working electrode port 202 is designed to sit between the grips of the tensile frame 102, so that the working electrode 302 is slightly suspended over the working electrode port 202. The electrochemical cell 124 is then overflown with the electrolyte 310, creating a meniscus over the working electrode port 202. The design of the electrochemical cell 124 allows the working electrode 302 to be completely soaked with the electrolyte 310, but also experience no friction, since the working electrode 310 is not in contact with the electrochemical cell 124. In other embodiments, the electrochemical cell 124 includes a third port for receiving a reference electrode and to accommodate a three-electrode electrochemical setup. The mechanical and electrochemical measurements are performed simultaneously, but controlled independently. Using the mechanical and electrochemical test apparatus 100 on a material, the parameters that can be controlled are: 1) the stress or strain 2) the current or potential 3) the rate of change of either aforementioned parameters. Therefore, experimental insights can be given for mechanisms including: a) damage, b) fatigue, c) electrochemical degradation, d) electrochemical cycling life.

Working Example

An electrochemical cell module was designed to fit the tensile stage and was 3D printed in acrylonitrile butadiene styrene (ABS). Since the 3D-printed part is inevitably porous, the cell was coated with a plastic sealant. In other cases, the cell was submerged in acetone for 15 s, causing superficial melting of the ABS plastic, filling the pores between the printing layers. The electrochemical cell was designed specifically to fit in a cavity of the tensile frame, between the grips for simultaneous electrochemical and mechanical characterization of the tested sample. 2-electrode and 3-electrode versions of the electrochemical cell have been designed, but the tests shown in this work were performed on symmetric supercapacitors, therefore using the 2-electrode design. The 2-electrode cell (FIG. 2) includes ports for a working electrode (WE) and a counter electrode (CE). The WE port is placed between the grips and the WE is the specimen under mechanical testing. The cell is overflown with electrolyte to create a meniscus over the WE port, allowing the WE film to be completely soaked with electrolyte, while hovering over the WE port, leading to a frictionless setup (FIG. 3). Current collectors are not required due to the inherent high conductivity of rGO. The addition of a discrete current collector would introduce large errors in the mechanical testing of the WE.

Materials

Amongst the most common of all electrode materials for the aforementioned applications is graphene: a two-dimensional nanocarbon that exhibits very attractive electrochemical and mechanical properties, such as high surface area, high capacitance, excellent conductivity and thermal stability, and also high mechanical strength and modulus. However, the technically difficult and costly fabrication processes of graphene, such as mechanical exfoliation and epitaxial growth on metal surfaces, have led to the increased popularity of chemically or thermally reduced graphene oxide (rGO). Symmetric graphene-based supercapacitors store energy via the formation of the electric double layer (EDL), where ions are adsorbed on the available surface area of the electrodes. The dependence of the graphene electrodes' electrochemical properties to applied stress or the mechanical stresses developed during electrochemical charging/discharging have not been extensively studied. However, multiple studies have focused on bendable graphene-based supercapacitors, exhibiting little-to-no change in the capacitance of the device at a bent state. Additionally, graphene-based supercapacitor cells have been compressed, showing that the capacitance of the device depends on the applied stress or strain. Moreover, several studies have been conducted on graphene-based composites as strain sensors, concluding that any kind of applied strain has an effect on the electrical resistance, which in turn may affect the capacitance. Although theoretical studies and electrochemo-mechanical simulations have been performed lately, experimental exploration still remains scarce due to the lack of experimental instrumentation.

Graphite (SP-1) was ordered from Bay Carbon, while Potassium hydroxide (KOH) and hydrogen peroxide ($O_2$, 30%) were purchased from VWR. Additionally, highly concentrated dimethyl sulfoxide (DMSO, ≥99.9%), sulfuric acid ($H_2SO_4$, 95.0-98.0%), hydrochloric acid (HCl, 37%) were acquired from Sigma Aldrich. Sodium nitrate ($NaNO_3$), and potassium permanganate ($KMnO_4$) were purchased in solid form from Sigma Aldrich as well. Deionized water was produced by a Milli-Q® Synthesis A10 system. For vacuum assisted filtration, nylon membrane filters were used (non-sterile, 47 mm diameter, 0.2 μm pore size) that were purchased from Thermo Fisher scientific.

Fabrication of rGO Strips

Graphene was produced from graphite by chemical oxidation using a modified Hummer's method. First, 3 g of powdered graphite were weighted and dispersed with 120 mL of $H_2SO_4$. Then, 2.5 g of solid $NaNO_3$ were added into the mixture. The mixture was then put in an ice bath to prevent temperature elevation and stirred for 5 h. Additionally, 15 g of $KMnO_4$ were slowly added. The mixture was then stirred for 2 more hours, at a constant temperature of 35° C. 250 mL of deionized (DI) water were slowly added to the mixture. Furthermore, 20 mL of $H_2O_2$ along with 700 mL of $H_2O$ were also poured in slowly. Then, 5 wt % HCl was added and the resulting mixture was subsequently vacuum filtered. After the solvents were filtered out, a solid paste was left on the filter paper, which was then dispersed into DI water. The remaining impurities were removed by dialysis. Afterwards, the mixture was dried overnight at 70° C., resulting in solid graphite oxide. The graphite oxide was crushed to powder and dissolved in DI water. The graphite was exfoliated to graphene oxide (GO) using ultrasonication, leading to a $GO/H_2O$ dispersion. Solvent exchange was used to achieve a 2 mg mL-1 GO/DMSO dispersion.

To fabricate the GO films from the GO/DMSO dispersion, 40 mg of dispersion were measured into a beaker and then stirred at 80° C. for 2 h to initiate hydrogen bonding between the GO sheets. Vacuum assisted filtration was employed to fabricate self-assembled GO films on a nylon filter membrane. The filtered GO films were rinsed with DI water and air-dried 24 h. Then, the film was removed from the membrane and was dried in an oven at 80° C. under vacuum for three days. After drying, the GO films were cut in 5 mm wide strips and thermally reduced at 200° C. under vacuum for 2 h to produce reduced GO (rGO) films. Typically, the thickness of the electrode films ranges between 10 μm and 20 μm.

Sample Preparation

Strips were then cut from the rGO films to produce WE and CE specimens. The WE strips are approximately 25 mm long by 5 mm wide, while the CE strips are 19 mm long by 5 mm wide. To prepare WE specimens, silver coated copper wires are connected at the ends of the strip using silver paste. The electrical connections are sandwiched by tabs made of two-part epoxy (Devcon 5-minute epoxy) and Parafilm®.

The tabs maximize grip at the clamps, therefore minimizing grip slip and also electrically insulate the specimen from the rest of the metallic frame of instrument, avoiding short-circuits. The length between the tabs corresponds to the gauge length. To ensure compatibility between mechanical and electrochemical testing, the gauge length is equal to the length of the CE, which is 19 mm, resulting in similar electrochemically active area of the WE and CE, since their width is also identical. The wires applied to the WE are then connected to a potentiostat (GAMRY interface 1000) using alligator clips. The CE is prepared in a similar way. A silver-coated copper wire is applied to the surface of the electrode with the use of silver paste. Silver paste (Sigma Aldrich silver conductive paste DGP80) is applied over the complete surface of the CE and then epoxy is applied over it. The epoxy protects the silver paste and ensures that it will not react electrochemically during the experiment. The applied wires are then connected to the potentiostat using alligator clips. After sample preparation is complete, the WE is clamped to the tensile stage and the CE is submerged into the CE port of the electrochemical cell.

The rGO films used to fabricate the CE specimens were weighted before preparation. Their weight was assumed to be equal to the weight of the WE's working area since both CE and WE were produced from the same film and their density and thickness are assumed equal.

Methods

A symmetric supercapacitor was assembled inside of our 3D printed cell, with rGO WE and CE, and 6M KOH electrolyte. The high inherent electrical conductivity of rGO allows for testing without current collectors and without large performance penalties. The WE was mounted at the grips of the tensile frame for uniaxial tensile testing, slightly suspended over the electrochemical cell to avoid friction (FIG. 3). The cell was overflown with electrolyte, resulting in soaking of the WE in electrolyte to perform electrochemical cycling. A 2 h soaking was allowed before any experiment to allow the WE to uptake electrolyte, which caused a slight change in dimensions.

As shown in Table 1, three classes of experiments were designed: i) Capacity retention at different levels of static strain; for these experiments, cyclic voltammetry (CV) and galvanostatic charge-discharge (GCD) measurements were performed under static tensile strain. ii) Stress development during electrochemical cycling; for these experiments, a displacement-controlled pre-stretch was applied and then the displacement was held constant, and the uniaxial stress was monitored during electrochemical cycling. iii) Electrochemical cycling under mechanical load; for these experiments, rGO electrodes were cycled for 1000 cycles unstressed and under tensile stress to compare the capacitance degradation.

TABLE 1

| Experimental Test Matrix | | |
|---|---|---|
| Test | Controlled parameters | Measured parameter |
| i. Capacity retention at different levels of static strain | 1. Displacement (step increase) | 1. Force |
| | 2a. Voltage (linear sweep - CV) | 2a. Current |
| | 2b. Current | 2b. Potential |

TABLE 1-continued

| Experimental Test Matrix | | |
|---|---|---|
| Test | Controlled parameters | Measured parameter |
| | (constant - GCD) | |
| ii. Stress development during electrochemical cycling | 1. Displacement (constant) | 1. Force |
| | 2. Current (constant - GCD) | 2. Voltage |
| iii. Electrochemical cycling under mechanical load | 1. Displacement (constant) | 1. Force |
| | 2. Current (constant - GCD) | 2. Current |

To perform experiment class (i), the electrodes were first electrochemically conditioned via 12 cycles of cyclic voltammetry at 20 mV s$^{-1}$. Then, a small mechanical pre-strain of 0.05 N was applied, before performing the first electrochemical measurement at the unstrained state. The WE was then uniaxially stretched by 0.2% strain, followed by another electrochemical measurement, followed by another uniaxial stretching, and so on, until mechanical failure. One last electrochemical measurement was taken after failure. For the CV experiments, the selected scan rates were 20 mV s$^{-1}$ 50 mV s$^{-1}$, and 100 mV s$^{-1}$. Similarly, for the GCD experiments, the selected current densities were 0.5 A g$^{-1}$ and 1 A g$^{-1}$. The potential window was set between 0 V and 1 V.

For experiment class (ii), the electrodes were also electrochemically conditioned via 12 cycles of cyclic voltammetry at 20 mV s$^{-1}$. Then, uniaxial stress of appx 9 MPa was applied to the WE via displacement-controlled loading. Subsequently, the displacement was kept constant and 1 h of stress relaxation was allowed, followed by GCD electrochemical cycling at current densities of 0.1 A g$^{-1}$ and 0.2 A g$^{-1}$ while the developed uniaxial stresses were monitored by the load cell. Afterwards, the WE was loaded to 9 MPa again, followed by 1 h of stress relaxation, followed by further electrochemical cycling and stress monitoring. In total, 5 stretching and stress monitoring steps were performed per test specimen.

Finally, for experiment (iii), the electrodes were electrochemically conditioned via 12 cycles of cyclic voltammetry at 20 mV s$^{-1}$. Afterwards, they were cycled for 1000 GCD cycles at a current density of 0.5 A g$^{-1}$ either at an unstressed state, or under stress. The degradation of the capacitance was then compared between the unstressed and the stressed specimens.

RESULTS AND DISCUSSION

Figure 10A:
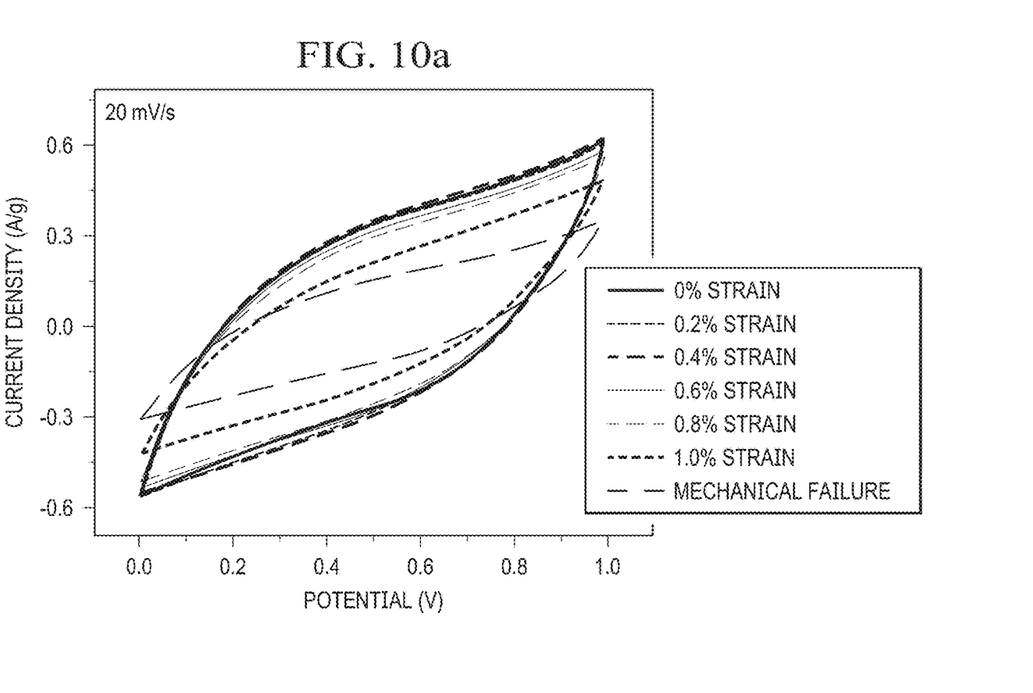
FIG. 10*a* is a graph showing cyclic voltammograms of symmetric reduced graphene oxide (rGO) supercapacitor at different strain levels.
Figure 10B:
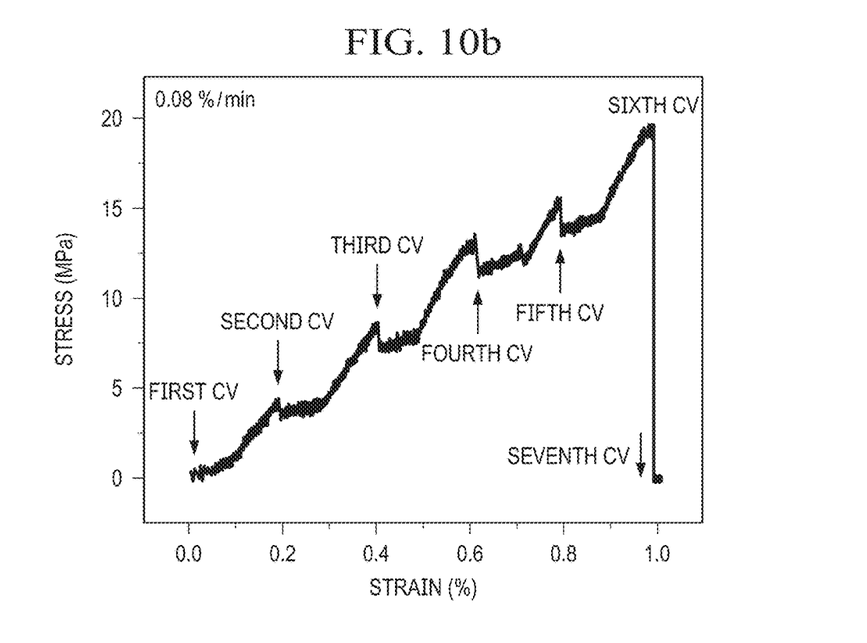
FIG. 10*b* is a graph of a tensile experiment of a working electrode (arrows indicate pause of tensile experiment to cycle electrochemically)

To measure the capacitance's dependence to the applied strain, we first performed electrochemical cycling at unstrained specimens as a baseline and then repeated the electrochemical characterization experiments under uniaxial tensile strain steps of 0.2% strain, until failure. Every test was repeated 5 times, and the strain at failure varied per sample up to 0.2%. The average strain at failure was appx 0.9%. FIGS. 10a and 10d show the output of the electrochemical cycling experiments at each strain state. Additionally, FIGS. 10b and 10e show a typical stress-strain response of the WE, with the electrochemical cycling steps marked on them. The capacitance measured at the reference state of 0% strain was considered the original capacitance, and the capacitance at each strain state was calculated as its percentage, as shown in FIGS. 10c and 10f.

During electrochemical cycling, a relaxation of the WE can be observed as a decreased in stress in the stress-strain curve. The relaxation of the WE specimens was verified with the use of digital image correlation (DIC). Such relaxation is a material response of the rGO film electrodes and is evident even at a dry state, with no electrolyte present. Additionally, according to FIGS. 10b and 10e, the beginning of each straining step has different gradient than the rest of the step. This is attributed to the "straightening" regime that graphene oxide papers are known to have in their stress-strain curve before the elastic regime. Such regime is attributed to wrinkling and waviness of the rGO paper film at multiple levels.

Figure 10C:
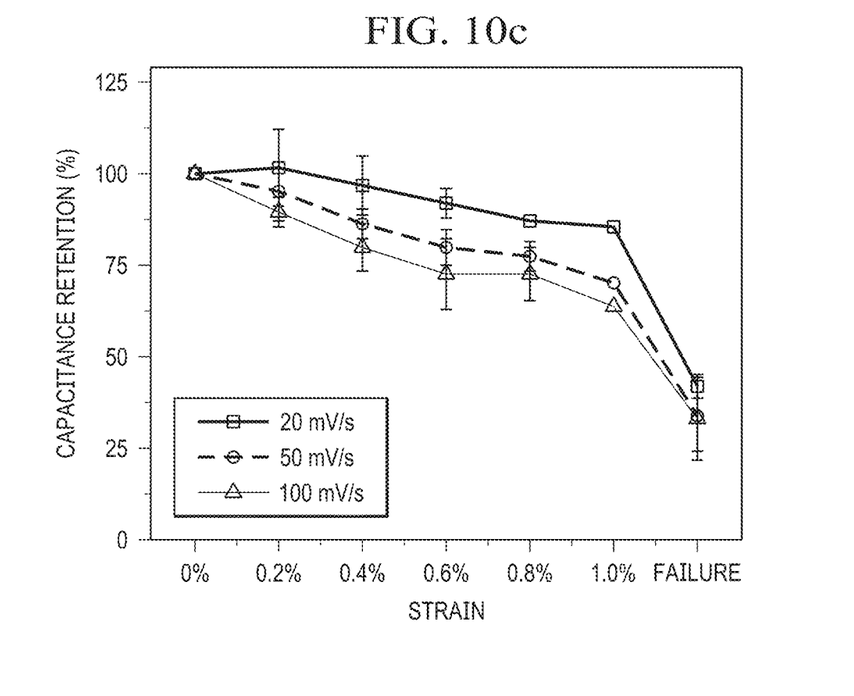
FIG. 10*c* is a graph showing capacity retention of the symmetric rGO supercapacitor at different levels of static strain.
Figure 10D:
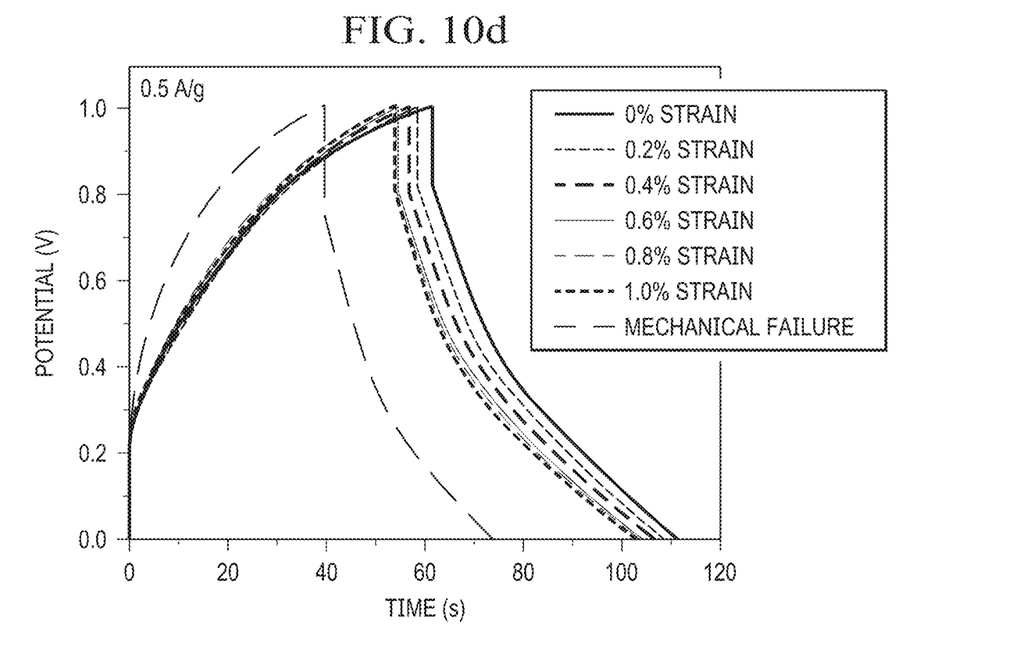
FIG. 10*d* is a graph showing galvanostatic charge-discharge curves of symmetric rGO supercapacitor at different strain levels.
Figure 10E:
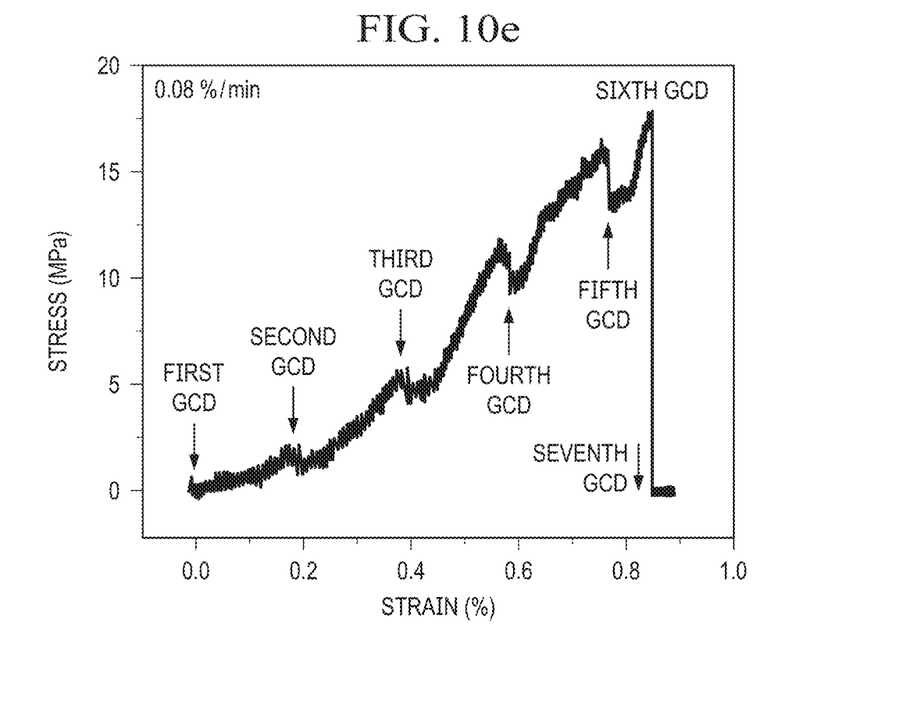
FIG. 10*e* is a graph Tensile experiment of an rGO working electrode. Arrows indicate pause of tensile experiment to cycle electrochemically.

FIGS. 10a and 10c show the output of cyclic voltammetry at different strain states and at different charging rates. Generally, only a small decrease in capacitance is noticed until failure, which constitutes rGO-based electrodes a good candidate for structural energy storage. The results, however, show that the specific capacitance degradation highly depends on the rate of electrochemical cycling. The lowest tested scan rate was 20 mV/s, and the specific capacitance before mechanical failure (at 1.0% strain) is retained by 85%. On the contrary, 100 mV/s was the highest scan rate explored, and the capacitance retention before mechanical failure was 63%. An intermediate scan rate of 50 mV/s was also tested and the results were between the other two. Specifically, the capacitance retention before failure was 70%. These results show that the applied strain and the time scale of the electrochemical experiment are important parameters regarding the capacitance retention of a supercapacitor electrode.

Figure 10F:
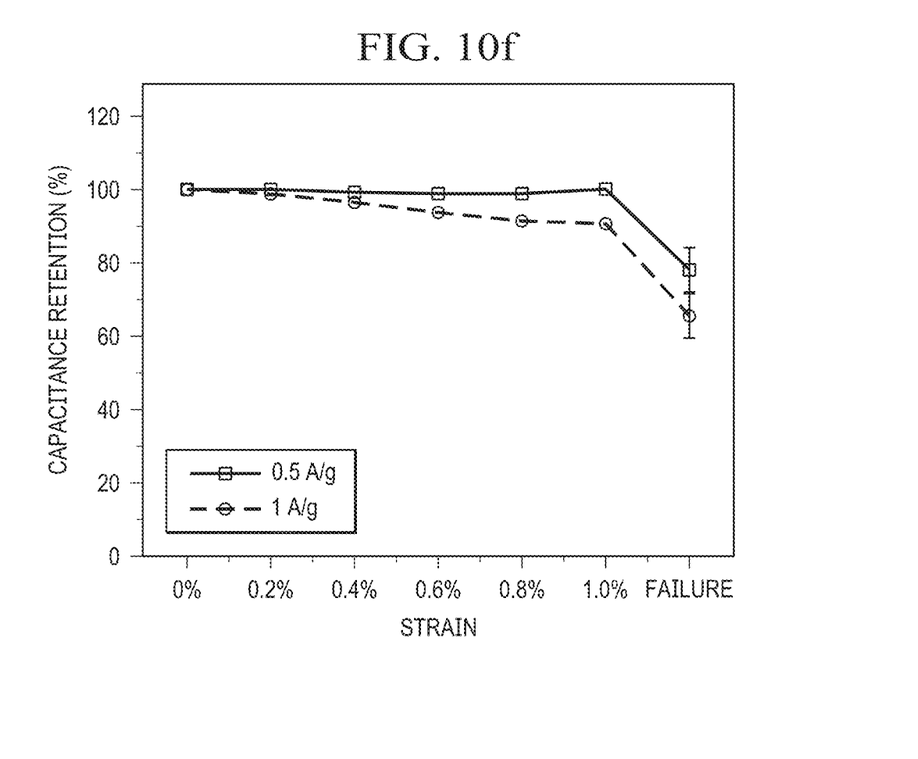
FIG. 10*f* is a graph showing capacity retention of the symmetric rGO supercapacitor at different levels of static strain.

Additionally, FIGS. 10d and 10f show the output of the GCD experiments at different levels of static strain. They depict the charge-discharge curves at different strains, and the retention of specific discharge capacitance as a function of the applied strain, respectively. The specific capacitance degrades very minimally until mechanical failure. Similar to the CV results, a dependence of the capacitance retention to the time scale of the electrochemical cycling was shown. Specifically, a higher current density discharge of 1 A/g showed a capacitance retention of 91% before mechanical failure. Respectively, slower discharging with a current density of 0.5 A/g showed 99% capacitance retention before failure. The GCD experiments were generally slower than the CV, explaining the smaller capacitance degradation. Dependence of the capacitance retention to the time scale of the experiment physically means that the EDL requires more time to be formed at higher strains, potentially due to the decrease in conductivity as a result of the applied strain.

Figure 11:
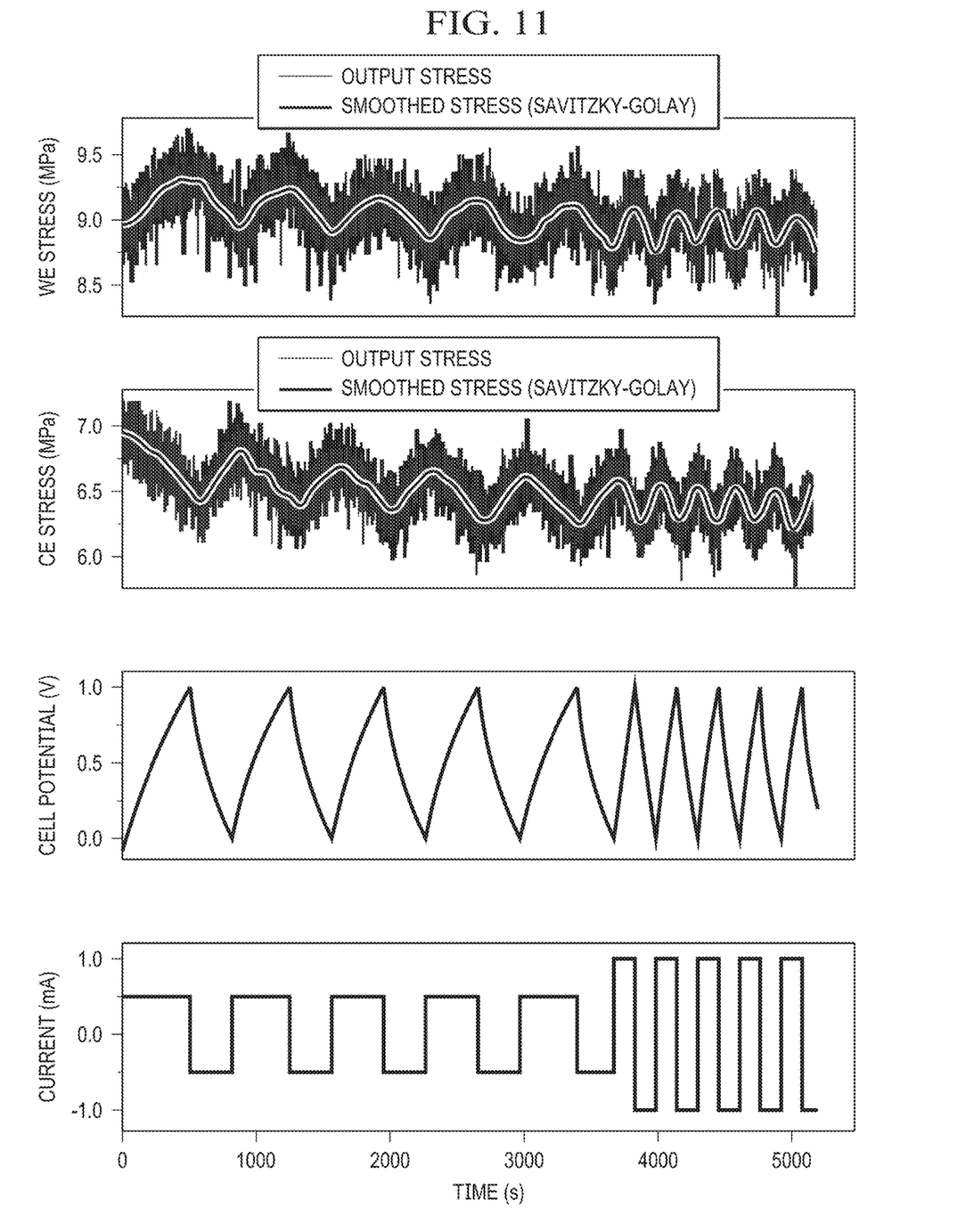
FIG. 11 is a graph showing development of stresses during electrochemical cycling on the working and counter rGO electrodes of the symmetric supercapacitor.

Furthermore, the developed stresses on the WE due to electrochemical stimulus were studied via stress monitoring during electrochemical cycling, as shown in FIG. 11 (experiment (ii)). The WE was cycled using constant current (GCD) between 0 V-1 V. In the meantime, data taken from the load cell measured the developed in-plane stress during electrochemical cycling. The experiment was then repeated after swapping the leads to the potentiostat, changing the WE from positively to negatively charged, essentially making it the CE of the cell. Different currents were used to alter the cell potential more rapidly, in order to compare rate effects.

From FIG. 11, it can be seen that small stresses are developed on the WE during electrochemical cycling, which are in-phase with the cell potential. The magnitude of the stress is small, leading to low signal-to-noise ratio, and the application of a smoothing function (using the Savitzky-Golay method) was therefore required. However, the trend of the stress is easily observable. Furthermore, the magnitude of the stress is independent of the magnitude of the current and therefore the charging rate. The development of such stresses is attributed to the movement of the ions between the stacks of rGO in the microstructure of the test specimen. Specifically, during charging, the positively charged WE achieves charge neutrality by forming an EDL with natively charged $OH^-$ ions. Therefore, the concentration of $K^+$ ions decreases around the rGO stacks, in the expense of a higher concentration of $OH^-$ ions. Due to the $OH^-$ ions being physically smaller than the $K^+$ ions, a volumetric decrease occurs, which in turn leads to increase in stress. To verify this assumption, we swapped the leads of the two electrodes to the potentiostat, therefore charging the WE negatively, essentially making it the CE of the cell. Based on our assumption, the negatively charged electrode should now have a large concentration of larger, positive $K^+$ ions adsorbed to it and therefore experience a volumetric increase, and therefore, a decrease in stress. The results verify this assumption as shown in FIG. 11.

Although various embodiments of the present disclosure have been illustrated in the accompanying Drawings and described in the foregoing Detailed Description, it will be understood that the present disclosure is not limited to the embodiments disclosed herein, but is capable of numerous rearrangements, modifications, and substitutions without departing from the spirit of the disclosure as set forth herein.

The term "substantially" is defined as largely but not necessarily wholly what is specified, as understood by a person of ordinary skill in the art. In any disclosed embodiment, the terms "substantially," "approximately," "generally," and "about" may be substituted with "within [a percentage] of" what is specified, where the percentage includes 0.1, 1, 5, and 10 percent.

The foregoing outlines features of several embodiments so that those skilled in the art may better understand the aspects of the disclosure. Those skilled in the art should appreciate that they may readily use the disclosure as a basis for designing or modifying other processes and structures for carrying out the same purposes and/or achieving the same advantages of the embodiments introduced herein. Those skilled in the art should also realize that such equivalent constructions do not depart from the spirit and scope of the disclosure, and that they may make various changes, substitutions, and alterations herein without departing from the spirit and scope of the disclosure. The scope of the invention should be determined only by the language of the claims that follow. The term "comprising" within the claims is intended to mean "including at least" such that the recited listing of elements in a claim are an open group. The terms "a," "an," and other singular terms are intended to include the plural forms thereof unless specifically excluded.

What is claimed is:

1. A mechanical and electrochemical testing apparatus, comprising:
   a tensile frame having a first grip and a second grip;
   an electrochemical cell disposed between the first grip and the second grip, the electrochemical cell having a working electrode port and a counter electrode port;
   an electrolyte disposed in the electrochemical cell;
   a working electrode coupled to the first grip and the second grip, the working electrode in contact with the electrolyte in the working electrode port;
   a counter electrode disposed in the counter electrode port; and a potentiostat coupled to the working electrode and the counter electrode, wherein the working electrode port and the counter electrode port are configured to contain liquid electrolyte such that a liquid meniscus may form.

2. The mechanical and electrochemical testing apparatus of claim 1, comprising a load cell coupled to the tensile frame.

3. The mechanical and electrochemical testing apparatus of claim 1, comprising a linear encoder coupled to the tensile frame.

4. The mechanical and electrochemical testing apparatus of claim 1, wherein the potentiostat is coupled to the working electrode via a first wire and a second wire.

5. The mechanical and electrochemical testing apparatus of claim 4, wherein the potentiostat is coupled to the counter electrode via a third wire.

6. The mechanical and electrochemical testing apparatus of claim 5, wherein the first wire, the second wire, and the third wire are silver-coated copper wires.

7. The mechanical and electrochemical testing apparatus of claim 1, wherein the working electrode contacts a meniscus of the electrolyte in the working electrode port.

8. The mechanical and electrochemical testing apparatus of claim 7, wherein the working electrode does not contact the working electrode port.

9. The mechanical and electrochemical testing apparatus of claim 1, wherein the working electrode port has height that is less than the first and second grips.

10. The mechanical and electrochemical testing apparatus of claim 1, wherein the counter electrode port has height that is less than the working electrode port.

11. The mechanical and electrochemical testing apparatus of claim 1, wherein the counter electrode is constructed of a carbon-based composite.

12. A method of mechanical and electrochemical testing, the method comprising:

securing a working electrode between a first grip and a second grip of a tensile frame, the first and second grips being configured to be oppositely disposed relative to the working electrode;

contacting the working electrode with an electrolyte disposed in an electrochemical cell;

electrically coupling the working electrode to a potentiostat;

coupling a counter electrode to the potentiostat;

placing the counter electrode in the electrochemical cell such that the counter electrode is in contact with the electrolyte; and applying a potential difference to the working electrode and the counter electrode via the potentiostat;

applying a stress to the working electrode via the tensile frame;

measuring a strain experienced by the working electrode.

13. The method of claim 12, wherein the potential difference is applied in cyclical pattern.

14. The method of claim 12, wherein the potential difference is applied in a linear cyclical pattern or a sinusoidal pattern.

15. The method of claim 12, wherein the working electrode is coupled to the potentiostat via a first wire and a second wire.

16. The method of claim 15, wherein the counter electrode is coupled to the potentiostat via a third wire.

17. The method of claim 12, comprising measuring a stress applied to the working electrode via a load cell.

18. The method of claim 17, wherein the measuring the strain comprises utilizing a linear encoder.

19. The method of claim 12, wherein:

the electrochemical cell comprises a working electrode port and a counter electrode port that are each configured to contain liquid electrolyte; and the electrolyte disposed in the electrochemical cell forms a meniscus that extends above the working electrode port.

20. A method of sample preparation for mechanical and electrochemical testing, the method comprising:

connecting, utilizing silver paste, a first wire to a first end of a working electrode;

connecting, utilizing silver paste, a second wire to a second end of the working electrode;

utilizing epoxy tabs to electrically insulate the first end and the second end of the working electrode and improve grip;

connecting, utilizing silver paste, a third wire to a counter electrode; and applying an epoxy backing on the counter electrode to prevent degradation of the silver paste.

* * * * *